United States Patent [19]

Yoshino et al.

[11] Patent Number: 4,975,222

[45] Date of Patent: Dec. 4, 1990

[54] RADIATION DETECTING ELEMENTS AND METHOD OF DETECTION

[75] Inventors: Katsumi Yoshino, 166-3, Obu-cho, Kishiwada-shi, Osaka-fu; Ryuichi Sugimoto, Izumi; Jiro Okube, Osaka, all of Japan

[73] Assignees: Katsumi Yoshino, Osaka; Mitsui Toatsu Chemicals, Inc., Tokyo; Sumitomo Electric Industries, Ltd., Osaka, all of Japan

[21] Appl. No.: 263,116

[22] Filed: Oct. 26, 1988

Related U.S. Application Data

[63] Continuation-in-part of Ser. No. 910,466, Sep. 23, 1986, abandoned.

[51] Int. Cl.$^5$ .......................... G02F 1/17; C09K 3/00
[52] U.S. Cl. .................... 252/586; 252/600; 252/500; 252/512; 252/518; 260/402.5; 430/269; 350/311
[58] Field of Search ............... 252/600, 962, 582, 586, 252/500, 512, 518; 260/402.5; 430/269, 281, 336; 250/336.1; 350/311

[56] References Cited

U.S. PATENT DOCUMENTS

| | | | |
|---|---|---|---|
| 3,729,313 | 4/1973 | Smith et al. | 430/332 |
| 3,954,816 | 5/1976 | Bloom et al. | 260/404.5 |
| 3,988,158 | 10/1976 | Muramatsu et al. | 430/631 |
| 4,011,176 | 3/1977 | Saunders et al. | 252/500 |
| 4,033,905 | 7/1977 | Bloom et al. | 252/299.2 X |
| 4,046,950 | 9/1977 | Isett | 428/704 |
| 4,051,075 | 9/1977 | Smith-Johannsen et al. | 252/511 |
| 4,066,676 | 1/1978 | Bloom et al. | 260/402.5 |
| 4,093,358 | 6/1978 | Shattuck et al. | 252/600 X |
| 4,285,575 | 8/1981 | Imataki et al. | 350/357 |
| 4,460,677 | 7/1984 | Smith et al. | 430/336 |
| 4,505,844 | 3/1985 | Denisevich, Jr. | 252/500 |
| 4,519,940 | 5/1985 | Schroeder et al. | 252/500 |
| 4,610,811 | 9/1986 | Yamamoto et al. | 252/511 |
| 4,618,454 | 11/1986 | Ballard et al. | 252/500 |

OTHER PUBLICATIONS

Yoshino, "Radiation Detector . . . ", Kobunshi Ronbunshu, vol. 41, No. 4, (Apr. 1984), pp. 177–182.
Kaneto et al., Japanese J. Appl. Phys., vol. 22, No. 7, (Jul. 1988), pp. L412–L414, "Characteristics of . . . Polythiophene and Polypyrrole . . . ".
Nigrey et al., J. Electrochem. Soc.: Electrochemical Science and Technology, (Aug. 1981), pp. 1651–1654, "Lightweight Rechargeable . . . Polyacetylene".
Crivello, Advanced in Polymer Science, 62, Springer-Verlag Berlin Heidelberg, (1984), pp. 1–48, "Cation Polymerization-Lodonium and Sulfonium Salt Photoinitiators".
Yoshino et al., Japanese J. Appl. Phys., vol. 22, No. 3, (Mar. 1983), pp. L157–L158, "Utilizing Doping . . . Conducting Polymers".
Chiang et al., J. Chem. Phys., 69 (11), (Dec. 1, 1979), pp. 5098–5104, "Conducting Polymers: Halogen Doped Polyacetylene".

(List continued on next page.)

*Primary Examiner*—Mary C. Lee
*Assistant Examiner*—Catherine S. Kilby Scalzo
*Attorney, Agent, or Firm*—Burns, Doane, Swecker & Mathis

[57] ABSTRACT

Radiation detecting solid elements consisting of conductive polymers and radiation sensitive materials which are capable of generating radiation induced substances composing the dopant of the conductive polymers. The elements are monolayer sheets obtained by impregnating or compounding the conductive polymers, such as, polythiophene and polyselenophene, with radiation sensitive materials, such as, diphenyliodonium chloride and triphenylsulfonium hexafluoroarsenate(V). The elements are also laminated sheets consisting of conductive polymer films and radiation sensitive material containing films. As radiation exposure causes variation in electrical conductivity and absorption spectrum of the elements, radiation can be detected by the variation of these properties.

25 Claims, 7 Drawing Sheets

OTHER PUBLICATIONS

Watt et al., Journal of Polymer Science: Polymer Chemistry Edition, vol. 22, (1984), pp. 1789–1796, ". . . Hexafluorophosphate".

Crivello et al., J. Org. Chem., vol. 43, No. 15, (1978), p. 3056, ". . . Sulfonium, Selenonium, Diaryliodonium".

Crivello et al., Journal of Polymer Science: Polymer Chemistry Edition, vol. 18, (1980), pp. 2677–2695, "Complex Triarylsulfonium . . . ".

Crivello et al., Journal of Polymer Science: Polymer Chemistry Edition, vol. 17, (1979), pp. 977–999, ". . . Triarylsulfonium Salts".

Crivello et al., J. Radiat. Curing, 5 (1), (Jan. 1978), pp. 2–17, "Triarylsulfonium Salts . . . ".

Crivello et al., Macromolecules, vol. 10, No. 6, (Nov.–Dec. 1977), pp. 1307–1315, "Diaryliodonium . . . ".

Yoshio et al., Japanese J. Appl. Phys., vol. 21, No. 9, (Sep. 1982), pp. L569–L570, ". . . Polyacetylene ($I_2$ doped)".

Kaneto et al., J. Chem. Soc., Chem. Commun., (1983), pp. 383–383, ". . . Polythiophene".

Matsukawa et al., Japanese J. Appl. Phys., vol. 21, No. 10, (Oct. 1982), pp. L657–L659, "Conical Pinched Electron Beam . . . ".

Shirakawa et al., Polymer Journal, vol. 4, No. 4, (1973), pp. 460–462, "Raman Scattering and Electronic Spectra of Poly(acetylene)".

Yoshino, Katsumi et al., "Enhancement of Electrical Conductivity of Polyacetylene by Electron Beam Irradiation in the Presence of Dopant", pp. L376–L378.

RADIATION DETECTING ELEMENTS AND METHOD OF DETECTION

This is a continuation-in-part of application Ser. No. 910,466, filed on Sept. 23, 1986, now abandoned.

BACKGROUND OF THE INVENTION

1. Field Of The Invention

The present invention relates to solid elements and a method for detecting radiation. More particularly, it relates to radiation detecting solid elements consisting of conductive polymers and radiation sensitive materials, and a method for detection by use of the same.

2. Background Art

Recently, electron beams, gamma-, alpha-, beta- and X-rays and neutron beams have been utilized for many purposes in various ways. In order to perform as expected the application of such radiation exposure, it is essential to precisely measure radiation dose.

On the other hand, for the safety of operators who are engaging in such radiation application industries and medical services, it is also very important to detect and measure the radiation quantity at any time. Under these conditions, many kinds of detecting instruments are commercially available to rapidly and sensitively determine various radiation doses.

For example, in a variety of application fields including electron beam processing, cellulose triacetate films are often used for the detecting and measuring elements of the radiation dose which are simple and easy to handle. Because the UV-absorption spectrum of the films vary with radiation exposure, the quantity of radiation exposure can be detected and measured by reading the variation of the absorption coefficient of the characteristic wave length.

Also, the thermal stimulation current measuring method is often used. When the solid is irradiated, an electric charge is generated in accordance with the radiation dose and stored in a trap of the solid. The electric charge is emitted upon a temperature rise, accompanied by evolution of current. The thermal stimulation current measuring method uses this phenomenon. After irradiation, the sample is connected with an external circuit and the temperature is raised at a constant rate. The quantity of electric charge in the sample is evaluated by the amount of current evolved in the circuit. The radiation dose is inspected by the value of the evaluation.

Recently Yoshino et al. have also proposed simpler elements and method for detecting radiation. This method utilizes the fact that the conductivity and absorption spectrum of the conductive polymers remarkably vary by the radiation exposure in a gas including sulfur hexafluoride. [KOBUNSHI RONBUNSHU 41, No. 4,177-182 (Apr. 1984)]

However, the method with cellulose triacetate, for example, requires an UV light source and cannot identify the presence of irradiation by visual inspection and the detection range is 10 Mrad and less.

Further, the thermal stimulation current measuring method requires micro-ammeters to examine the charge emission and results in a large instrument and a long time for estimation. Both methods cannot perform the determination under irradiation and require interruption of the irradiation in order to take out the elements or the sample for measurement.

Regarding this point, the method proposed by Yoshino et al. which uses a combination of the conductive polymers and gas including sulfur hexafluoride, has the advantages of being a simple procedure and a broad range of measurement. And yet the method has the drawbacks of complexity and of restriction for handling the gas, which is a problem during actual use.

BROAD DESCRIPTION OF THE INVENTION

As described above, the conventional method and elements for detecting radiation generally have many problems such as high price, difficulty in handling, complicated operation, large size and restricted range of measuring. The present invention was carried out to solve these problems. The object of this invention is to provide novel detecting method and elements which are easy to handle, capable of continuously measuring the radiation dose during irradiation, and satisfactory in price.

BRIEF DESCRIPTION OF THE DRAWINGS

In the Drawings:

In FIGS. 1 to 11, the following numbers represent:

1 . . . monolayer sheet element
2 . . . conductive polymer film layer
3 . . . radiation sensitive material containing a film layer
4 . . . support
5 . . . electrode
6 . . . element

DETAILED DESCRIPTION OF THE INVENTION

Figure 1:
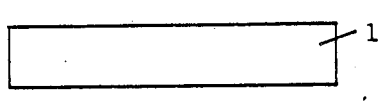
FIGS. 1 and 2 illustrate examples of the elements of this invention.

One of the results of the achieved objects of the present invention is the radiation detecting solid elements consisting of the conductive polymers and the radiation sensitive materials which are capable of generating radiation induced substances composing the dopant of said conductive polymers.

Another of the results of the achieved objects of the present invention is the method for detecting radiation which comprises detecting the variation of the electrical conductivity of the above-described radiation detecting solid elements.

Another of the results of the achieved objects of the present invention is the method for detecting radiation which comprises detecting the variation of the absorption spectrum of above described radiation detecting solid elements.

A still further of the results of the achieved objects of the present invention is the radiation detector which comprises the above-described radiation detecting solid elements and at least a pair of electrodes.

The conductive polymers of this invention are not restricted in particular and can be the polymers which have variable electrical conductivity and/or absorption spectrum by doping the dopant described below. The polymers include, for example, polyacetylene, polythiophene, polypyrrole, polyfuran, polyselenophene, poly-para-phenylene, poly-para-phenylenesulfide, polyaniline, poly-para-phenylenevinylene, poly-para-phenyleneoxide and polyheptadiyne.

The radiation sensitive materials of this invention can be the materials which decompose and/or dissociate by exposure to radiation including electron beams, gamma-, alpha-, beta- and X-rays and neutron beams, and generate the substance composing the dopant of the above-described conductive polymers.

The radiation sensitive materials include, for example, metal halides such as silver chloride, silver bromide, ferric fluoride, cupric fluoride, lead(II) iodide, bismith(III) iodide, cuprous iodide, silver iodide, cadmium iodide and diaryliodonium, triarylsulfonium and aryldiazonium salts having anions such as fluoride ion, chloride ion, bromide ion, iodide ion, perchlorate ion, tetrafluoroborate ion, hexafluorophosphate(V) ion, hexafluoroarsenate(V) ion and hexafluoroantimonate(V) ion.

The solid detecting elements of this invention can be solid matter consisting of the conductive polymers and the radiation sensitive materials. The solid matter is prepared by the following processes. In the first process, radiation sensitive materials are dispersed into or combined with the conductive polymers. In the second process, a layer of the solid conductive polymers is lapped with the layer of radiation sensitive materials or the layer containing the same.

The actual procedures of these processes include immersion of the conductive polymers into the solution containing the radiation sensitive materials, compounding of the radiation sensitive materials in the molding step of the conductive polymers, copolymerization of the conductive polymers with pendant radiation sensitive materials, and preparation of laminated structure by alternatively piling up conductive polymer films having proper thickness with other films obtained by impregnating the radiation sensitive materials into, for example, a polymer matrix.

Figure 2:
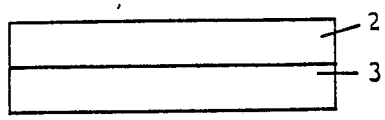
Figure 3:
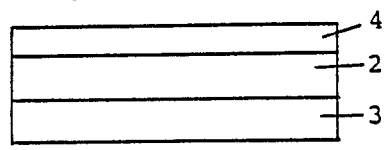
FIG. 3 illustrates an example of the element having a support of this invention.

FIG. 1 illustrates a side view of a monolayer sheet element. FIG. 2 shows a side view of typical double layer laminated sheet element. FIG. 3 illustrates a side view of typical laminated sheet element having a support.

In these Figures, 1 is a monolayer sheet element, 2 is a conductive polymer film layer, 3 is a film layer containing radiation sensitive materials, and 4 is a support such as polyethylene terephthalate.

Irradiation of the detecting elements thusly obtained causes variation in the electrical conductivity, light absorption spectrum and magnetic properties. Particularly, the detection of the variation in the electrical conductivity and/or light absorption spectrum can be conducted with a simple instrument having high sensitivity.

The detection of the irradiation by the electrical conductivity can be performed with a flat or a tubular structure having the elements and electrodes.

Figure 4:
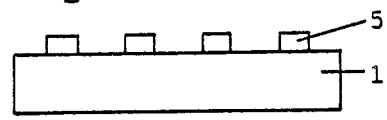
FIGS. 4 to 9 show examples of structure using the elements of this invention.
Figure 5:
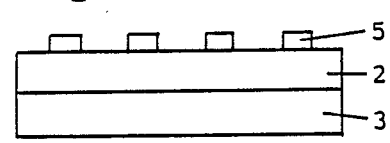
Figure 6:
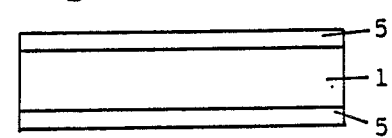

FIGS. 4, 5 and 6 are side views of structural examples where electrodes are attached to the elements of this invention for detecting radiation by the electrical conductivity.

Figure 7:
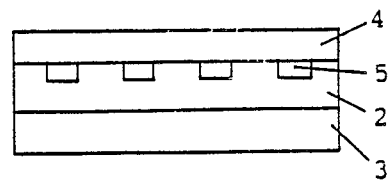
Figure 8:
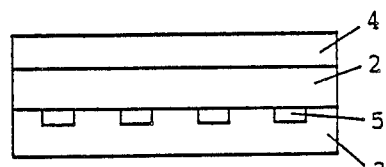
Figure 9:
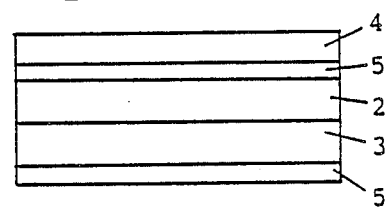

FIGS. 7, 8 and 9 illustrate side views of structural examples where the electrodes and support are attached to the elements of this invention.

In FIGS. 4 to 9, the numbers 1, 2, 3, and 4 are the same as above and 5 is for the electrodes.

Also the detection of variation in light absorption spectrum can be conducted by passing light to the perpendicular or parallel direction of the sheet and then measuring the absorption spectrum.

Figure 10:
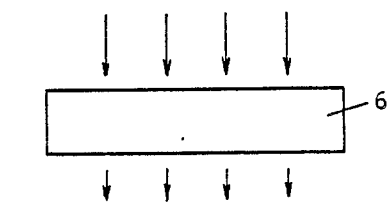
FIGS. 10 and 11 illustrate the relations between the elements of this invention and the direction of transmitting light.
Figure 11:
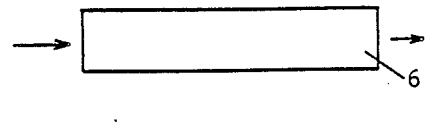

FIGS. 10 and 11 show side views of the elements and direction of the light. In these Figures, the number represents the elements of this invention and the arrows are the transmitting direction of the light.

The detection of irradiation can be performed very conveniently by measuring either the electrical conductivity or light absorption characteristics with the elements of this invention.

Also the electrical conductivity determination can be carried out very easily because the variable range of conductivity is $10^{-10}$ to $10^2$ S/cm. Elements having such easily measurable range have not yet been found by the prior art. The elements of this invention also enable measurement under irradiation.

The method for measuring variation in the light absorption characteristics can, of course, precisely determine the radiation dose by accurately measuring the transmittance. And yet the elements of this invention having the conductive polymers show a distinct color change in the visible region and, thus, have an advantage that visual observation can be very easily performed for the presence or absence of irradiation, approximate radiation dose etc.

The invention is illustrated further with respect to the following specific examples, which are not given as any limitation on the scope of the invention.

EXAMPLE 1

An electrochemically polymerized polythiophene film having a thickness of 12 μm was dipped into a dichloromethane solution of diphenyliodonium hexafluoroarsenate(V), and dried. The quantity of diphenyliodonium hexafluoroarsenate(V) absorbed in the film was 1.16 percent by mol per one mol of thiophene unit in the polythiophene. The elements were prepared from the film by cutting out small pieces having dimensions of 1 mm×10 mm. The conductivity of the elements thusly obtained was $5 \times 10^{-10}$ S/cm at the room temperature, increased to $4.5 \times 10^{-8}$ S/cm after irradiating with 12 Mrad of 1.8 MeV electron beams, and further increased to $2 \times 10^{-4}$ S/cm by irradiating with a 30 Mrad total sum of the beams. This result indicates that the radiation dose can be estimated by measuring the conductivity.

EXAMPLE 2

The procedure of Example 1 was repeated to prepare the elements except for the use of a polythiophene film having a thickness of 8 μm which was chemically synthesized by using iron(III) chloride as the oxidizing agent. The conductivity of the elements thusly obtained was $1 \times 10^{-8}$ S/cm at room temperature, increased to $5\times10^{-7}$ S/cm after irradiating with 12 Mrad of 1.8 MeV electron beams, and further increased to $2\times10^{-5}$ S/cm by irradiating with a 30 Mrad total sum of the beams.

EXAMPLE 3

In a glass mortar 3 grams of polythiophene powder obtained by chemically polymerizing thiophene using iron(III) chloride as the oxidizing agent was mixed with 1.1 grams of triphenylsulfonium hexafluoroarsenate(V) and 1 ml of dichloromethane, and dried. A cylindrical mold having an internal diameter of 10 mm was charged with 50 mg of the dried material and pressed for 10 minutes under a pressure of 600 kg/cm$^2$ to give circular sheet elements being 10 mm in diameter and 0.3 mm in thickness. The conductivity of the sheet elements was $3\times10^{-12}$ S/cm at room temperature and increased to $8\times10^{-8}$ S/cm after irradiating with 90 Mrad of 1.8 MeV electron beams.

EXAMPLE 4

The properties of luminescent diodes in use for various measuring instruments in irradiation chambers deteriorate by exposure to radiation doses above the permissible limit, and cause errors in the values measured. To prevent such error, it is required to know the absorption dose the luminescent diodes are exposed to. For this purpose, a radiation detecting structure was prepared by the following process.

An electrochemically polymerized polythiophene film having dimensions of 15 mm×25 mm×35 μm was coated with a suspension of 150 mg of diphenyliodonium chloride in a 10 percent aqueous polyvinyl alcohol solution to give a film having a thickness of 200 μm. The radiation dose detecting elements were obtained by cutting out small pieces of 2 mm×10 mm dimension from the resultant film. The elements were attached with a pair of platinum electrodes being 5 mm in distance and sealed with polypropylene except for the ends of the electrodes. The ends of the electrodes were connected with 50 m of 1.5 mm square double lead wires.

Figure 12:
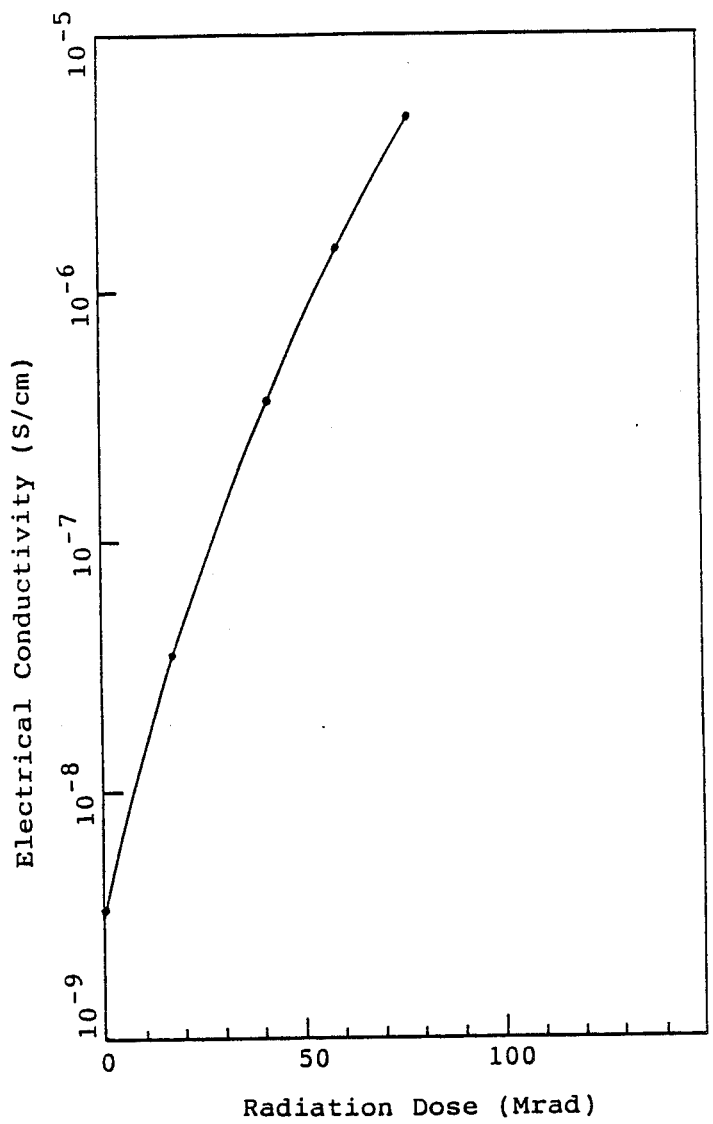
FIG. 12 shows the relations between radiation dose of electron beams and electrical conductivity measured by a typical example of the structure wherein the elements of this invention is applied.

The resultant radiation detecting structure was placed on a measuring instrument in an irradiation chamber and the lead wires were extended to a remote position outside of the chamber where an ohmmeter was installed and the electrical conductivity of the elements was measured. The electrical conductivity of the elements was $3.4\times10^{-8}$ S/cm at room temperature. FIG. 12 illustrates the relations between the radiation dose and the electrical conductivity under irradiation with 1.8 MeV electron beams. As clearly shown in the Figure, the elements obtained can continuously measure at the outside the exposed dose of the instrument in the irradiation chamber.

EXAMPLE 5

Figure 13:
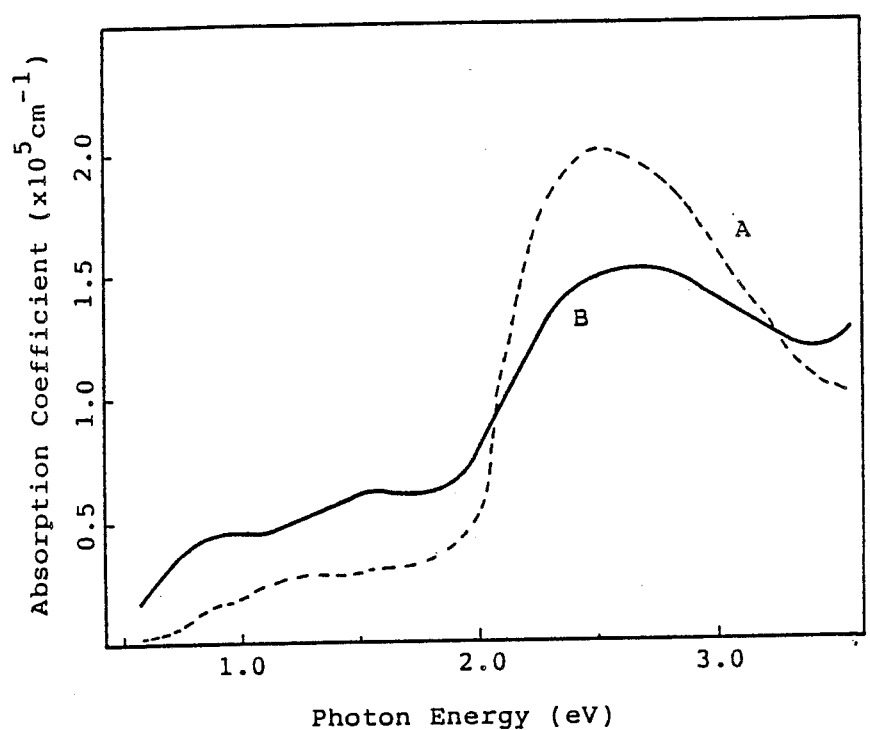
FIG. 13 shows examples of absorption spectra of the elements.

A polythiophene film having a thickness of 2 μm was electrochemically prepared on a polyethylene terephthalate film which was previously coated with a conductive indium oxide tin membrane. A solution of 50 mg of diphenyliodonium hexafluoroarsenate(V) and 500 mg of polystyrene in 30 ml of dichloromethane was cast on the polythiophene film and dried to form another film having a thickness of 7 μm. The elements thusly obtained were irradiated with 48 Mrad of 1.8 MeV electron beams. FIG. 13 illustrates the absorption spectra of the elements before and after irradiation. In FIG. 13, A is the absorption spectrum before irradiation and B is the spectrum after irradiation. The color turned from red to blue as detected by visual inspection. As a result, the radiation dose can be detected by the variation of the absorption characteristics.

EXAMPLE 6

In an inert atmosphere, a 300 ml glass vessel was charged with 300 ml of benzonitrile, 3-methylthiophene was added in an amount to give a concentration of 0.1 mol/l, and further LiBF$_4$ was added in an amount to obtain a concentration of 0.5 mol/l to prepare a uniform solution. A conductive glass plate having dimensions of 50 mm×60 mm and an indium-tin oxide film on its surface was used as the anode. A nickel plate having dimensions of 50 mm×60 mm was used as the cathode. The anode and cathode were dipped in the above solution, placed parallel to each other at a distance of 1 cm and an electrolysis was conducted for 30 minutes by applying a voltage of 20 V between both electrodes. After completing the reaction, dedoping was carried out for 30 minutes by short-circuiting both electrodes and applying a reversed polarity voltage of 3 V for 30 minutes. Then the anode was taken out of the solution, washed with methanol and successively washed with water to obtain a poly(3-methylthiophene) film formed on the electrode surface. The poly(3-methylthiophene) film thusly obtained had a thickness of 10 microns. A suspension of 300 mg of diphenyliodonium iodide in 20 ml of a tetrahydrofuran solution containing 500 mg of polyvinyl chloride was casted on the above obtained film to form a membrane having a thickness of about 20 microns.

Figure 14:
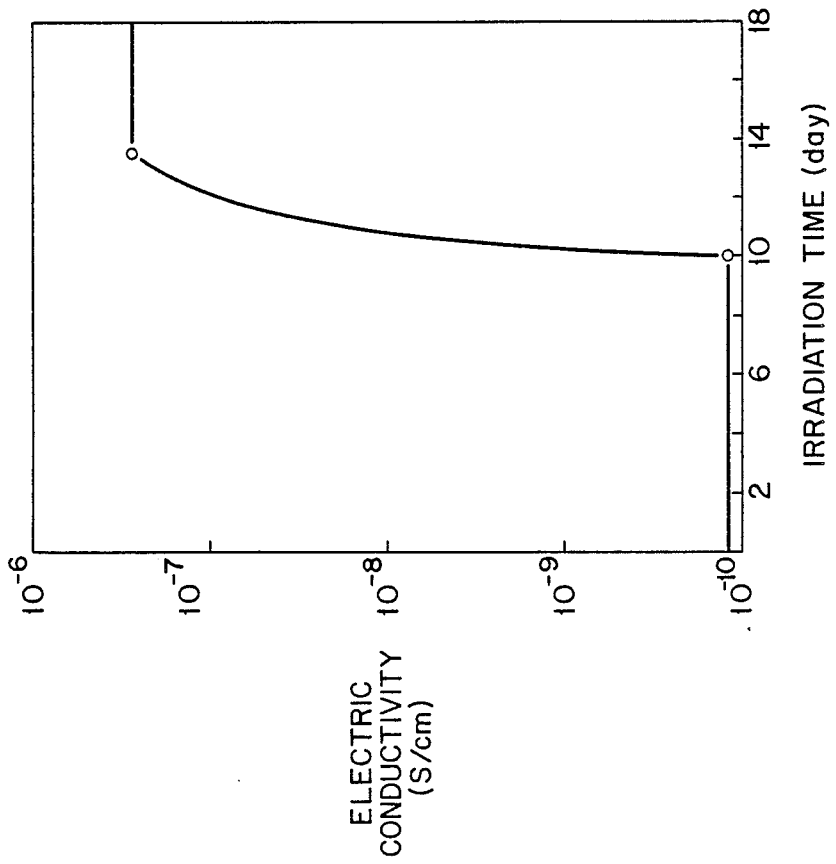

The resultant element had no change at all in the electric conductivity after storing in air at ordinary temperatures. The electric conductivity, however, was increased by irradiating with γ rays on the 10th day at a rate of 1 Mrad/hour as illustrated in FIG. 14. The electric conductivity was kept constant after terminating the irradiation of γ rays at the total irradiation exposure of 90 Mrad.

EXAMPLE 7

Figure 15:
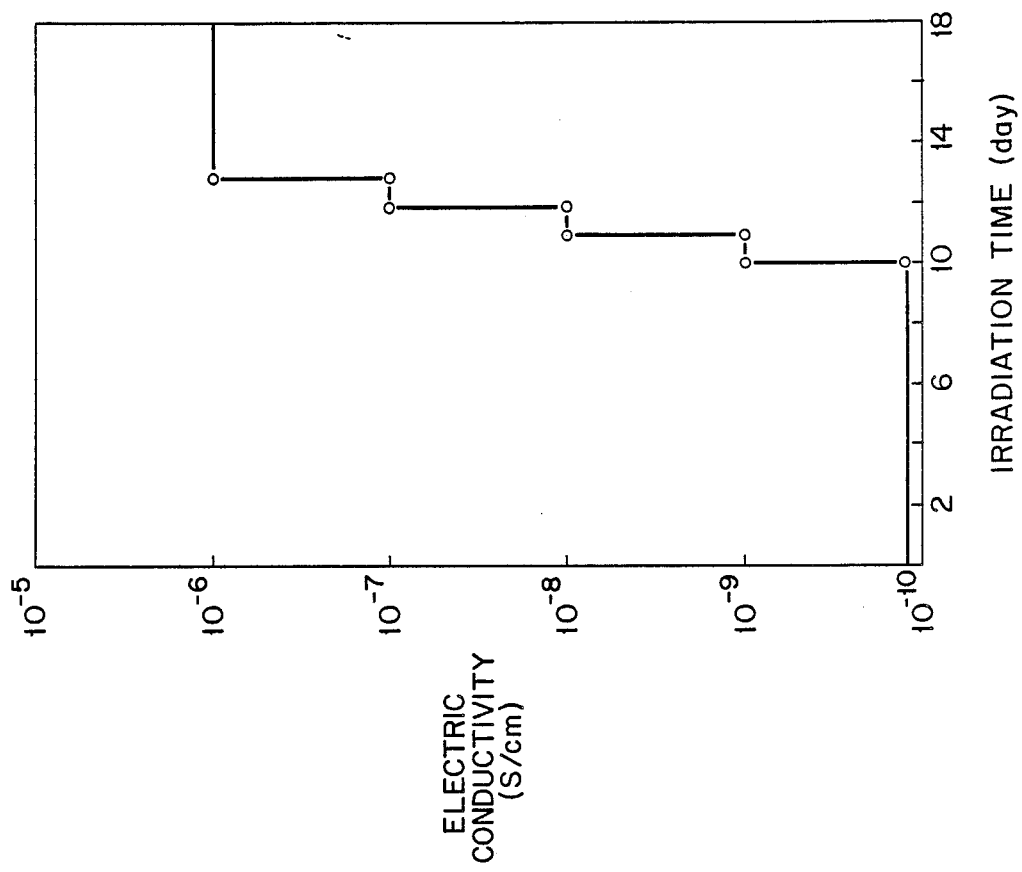
FIGS. 14 and 15 are graphs of the electrical conductivity versus irradiation time in Examples 6 and 7, respectively.

The same element as in Example 6 was intermittently irradiated with electron beams of 1.8 MeV each 12 Mrad from the 10th day. The electric conductivity was changed stepwise generally in proportion to the quantity of irradiation as illustrated in FIG. 15. The electric conductivity was kept constant after terminating the irradiation at the total irradiation exposure of 48 Mrad.

COMPARATIVE EXAMPLE 1

Figure 16:
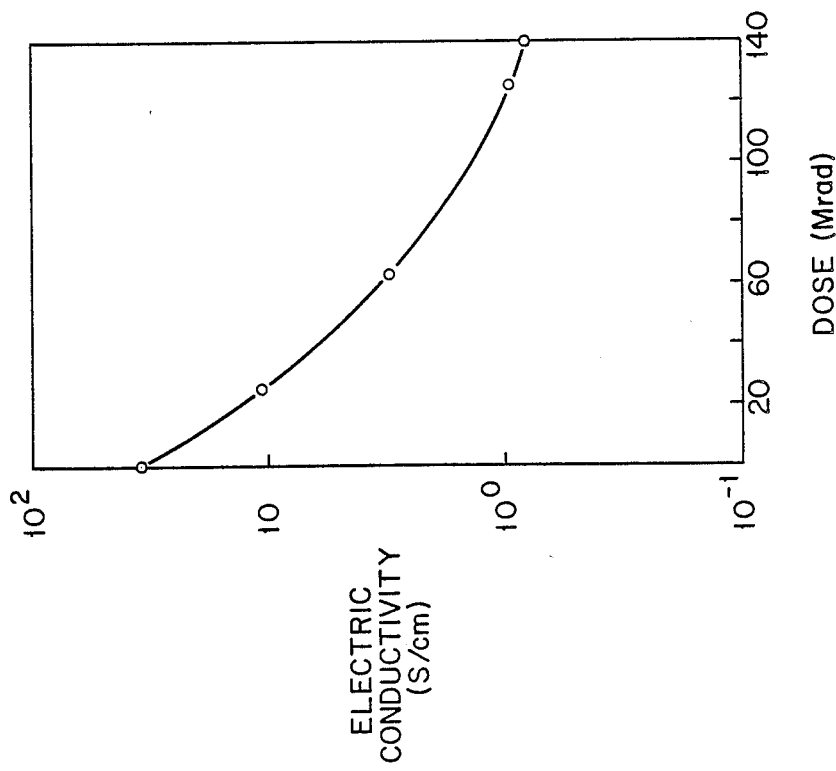

A film having a thickness of 10 microns as prepared in Example 7 was brought into contact with a saturated iodine gas for 24 hours at room temperature to give an iodine doped film. The doped film was continuously irradiated with electron beams of 1.8 MeV up to 140 Mrad. The electric conductivity of the film was gradually lowered as illustrated in FIG. 16.

As illustrated in Examples 6 and 7 and Comparative Example 1, the elements of the invention have very low electric conductivity before irradiation, whereas the marked increase in the electric conductivity is caused by irradiation with radioactive rays. On the other hand, the electric conductivity of the already doped polymer was decreased by irradiation with radioactive rays. Thus, the difference between the two cases is distinct.

COMPARATIVE EXAMPLE 2

Figure 17:
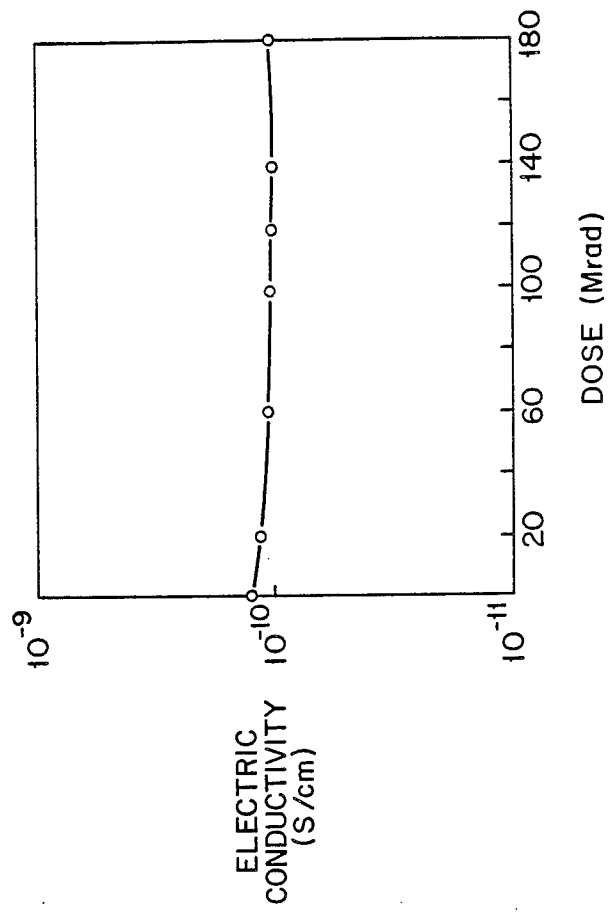
FIGS. 16 and 17 are graphs of the electrical conductivity versus dose in Comparative Examples 1 and 2, respectively.

A poly(3-methylthiophene) film having a thickness of 30 microns as prepared in Example 6 was dipped in a solution of lithium tetrafluoroborate (LiBF$_4$), taken out and dried. The amount of LiBF$_4$ absorbed on the film was 1.75 mol percent by mol per one mol of thiophene unit in poly(3-methylthiophene). A small piece 1 mm × 4 mm in size was cut out from the resultant film. The element thus obtained had an electric conductivity of $1.2 \times 10^{-10}$ S/cm at room temperature. The element was irradiated with electron beams of 1.8 MeV in a total amount of 180 Mrad. The electric conductivity was almost unchanged as illustrated in FIG. 17.

As is clearly understandable from Comparative Example 2, the element of the invention is distinctly different from that of polythiophene/LiBF$_4$ described in Yoshino et al., "Utilizing Doping And Undoping Processes of Conductive Polymers", Japan. J. Appl. Phys., Vol. 22, No. 3, (March 1983), pp. L157–L158, or Kaneto et al., "Characteristics Of Electro-Optic Device Using Conducting Polymers, Polythiophene and Polypyrrole Films", J. Chem. Soc., Chem. Commun., (1983), pp. 382–383.

What is claimed is:

1. A radiation detecting solid element comprising a conductive polymer and a solid radiation sensitive material which decomposes and/or dissociates by exposure to at least one form of radiation selected from electron beams, gamma rays, alpha rays, beta rays, X-rays and neutron beams wherein a variation in electrical conductivity, light absorption characteristics or magnetic properties of the conductive polymer occurs, said variation being proportional to the total amount of radiation to which the element is exposed with the proviso that where electrical conductivity varies, the electrical conductivity increases with an increasing amount of radiation.

2. The radiation detecting solid element of claim 1, wherein said conductive polymer is a compound selected from the group consisting of polyacetylene, polythiophene, polypyrrole, polyfuran, polyselenophene, poly-para-phenylene, poly-para-phenylenesulfide, polyaniline, poly-para-phenylenevinylene, poly-para-phenyleneoxide, and polyheptadiyne.

3. The radiation detecting solid element of claim 1, wherein said radiation sensitive material is a compound selected from the group consisting of silver chloride, silver bromide, ferric fluoride, cupric fluoride, lead(II) iodide, bismuth(III) iodide, cuprous iodide, silver iodide, and cadmium iodide or diaryliodonium, triarylsulfonium, and aryldiazonium salts having an anion selected from the group consisting of fluoride ion, chloride ion, bromide ion, iodide ion, perchlorate ion, hexafluoroarsenate(V) ion, and hexafluoroantimonate(V) ion.

4. The radiation detecting solid element of claim 3, wherein said radiation sensitive material is diphenyliodonium chloride, diphenyliodonium hexafluoroarsenate(V) or triphenylsulfonium hexafluoroarsenate(V).

5. The radiation detecting solid element of claim 1, wherein said conductive polymer is polythiophene and said radiation sensitive materials are diphenyliodonium hexafluoroarsenate(V) or triphenylsulfonium hexafluoroarsenate(V).

6. The radiation detecting solid element of claim 1, wherein the element is a monolayer sheet of said conductive polymer containing said radiation sensitive material.

7. The radiation detecting solid element of claim 1, wherein the element is a laminated sheet comprising one layer of said conductive polymer and one layer of said radiation sensitive material, wherein both of the layers are in contact.

8. The radiation detecting solid element of claim 7, wherein a support layer is present on at least one side of said radiation detecting solid element.

9. The radiation detecting solid element of claim 1, wherein a variation in electrical conductivity results.

10. The radiation detecting solid element of claim 1, wherein a variation in light absorption properties results in a noticeable color change.

11. A radiation detector which comprises said radiation detecting solid element claimed in claim 1 and at least a pair of electrodes.

12. The radiation detector of claim 11, wherein said radiation detecting solid element is comprised of a monolayer sheet and at least a pair of electrodes is in contact with one side of said monolayer.

13. The radiation detector of claim 11, wherein said radiation detecting solid element is comprises of a monolayer sheet and said electrodes are in contact with both sides of said monolayer sheet.

14. The radiation detector of claim 11, wherein said radiation detecting solid element is a monolayer sheet having an inside layer and an outside layer and at least a pair of electrodes is in contact with the outside or inside layer of said radiation detecting solid element.

15. The radiation detector of claim 11, wherein said radiation detecting solid element is a monolayer sheet having an inside layer and an outside layer and electrodes are in contact with both sides of the layer of the radiation detecting solid element layer.

16. A method for detecting at least one form of radiation selected from electron beams, gamma rays, alpha rays, beta rays, X-rays, and neutron beams comprising exposing a radiation detecting solid element comprising a conductive polymer and a solid radiation sensitive material which decomposes and/or dissociates by exposure to said radiation and determining the total amount of radiation by measuring a variation in electrical conductivity, light absorption characteristics or magnetic properties of the conductive polymer with the proviso that where electrical conductivity varies, the electrical conductivity increases with an increasing amount of radiation.

17. The method of claim 16, wherein said conductive polymer is a compound selected from the group consisting of polyacetylene, polythiophene, polypyrrole, polyfuran, polyselenophene, poly-para-phenylene, poly-para-phenylenesulfide, polyaniline, poly-para-phenylenevinylene, poly-para-phenyleneoxide, and polyheptadiyne.

18. The method of claim 16, wherein said radiation sensitive material is a compound selected from the group consisting of silver chloride, silver bromide, ferric fluoride, cupric fluoride, lead(II) iodide, bismuth(III) iodide, cuprous iodide, silver iodide, and cadmium iodide or diaryliodonium, triarylsulfonium, and aryldiazonium salts having an anion selected from the group consisting of fluoride ion, chloride ion, bromide ion, iodide ion, perchlorate ion, hexafluoroarsenate(V) ion, and hexafluoroantimonate(V) ion.

19. The method of claim 18, wherein said radiation sensitive material is diphenyliodonium chloride, diphenyliodonium hexafluoroarsenate(V) or triphenylsulfonium hexafluoroarsenate(V).

20. The method of claim 16, wherein said conductive polymer is polythiophene and said radiation sensitive materials are diphenyliodonium hexafluoroarsenate(V) or triphenylsulfonium hexafluoroarsenate(V).

21. The method of claim 16, wherein the element is a monolayer sheet of said conductive polymer containing said radiation sensitive material.

22. The method of claim 16, wherein the element is a laminated sheet comprising one layer of said conductive polymer and one layer of said radiation sensitive material, wherein both of the layers are in contact.

23. The method of claim 16, wherein a support layer is present on at least one side of said radiation detecting element.

24. The method of claim 16, wherein a variation in electrical conductivity results.

25. The method of claim 16, wherein a variation in light absorption properties results in a noticeable color change.

* * * * *